Aug. 27, 1946.    W. H. CUTTINO    2,406,321
SWITCHING DEVICE
Filed March 29, 1943
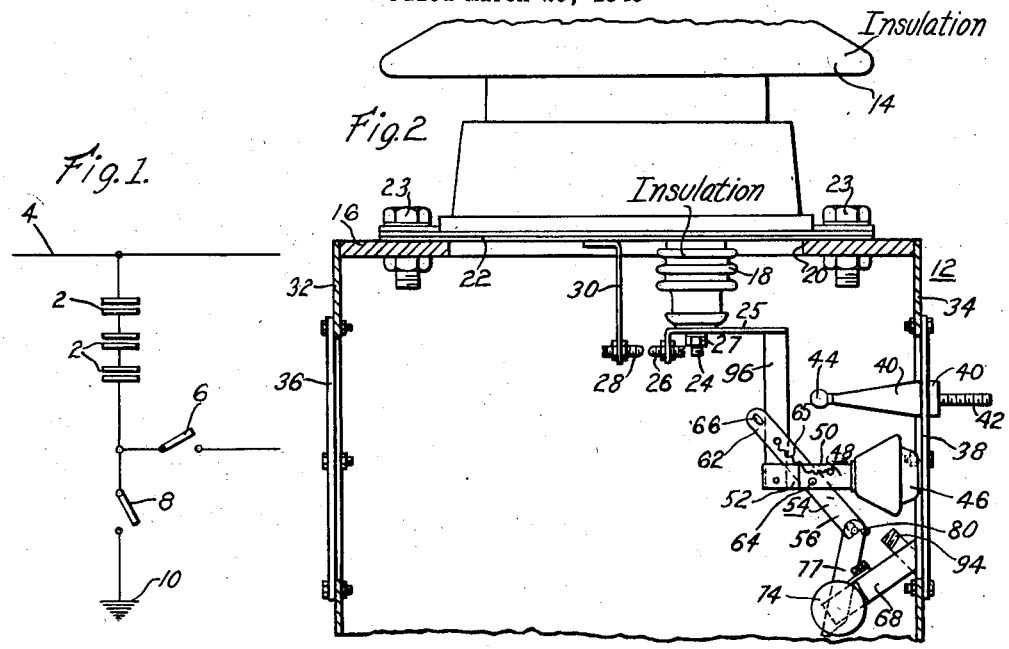
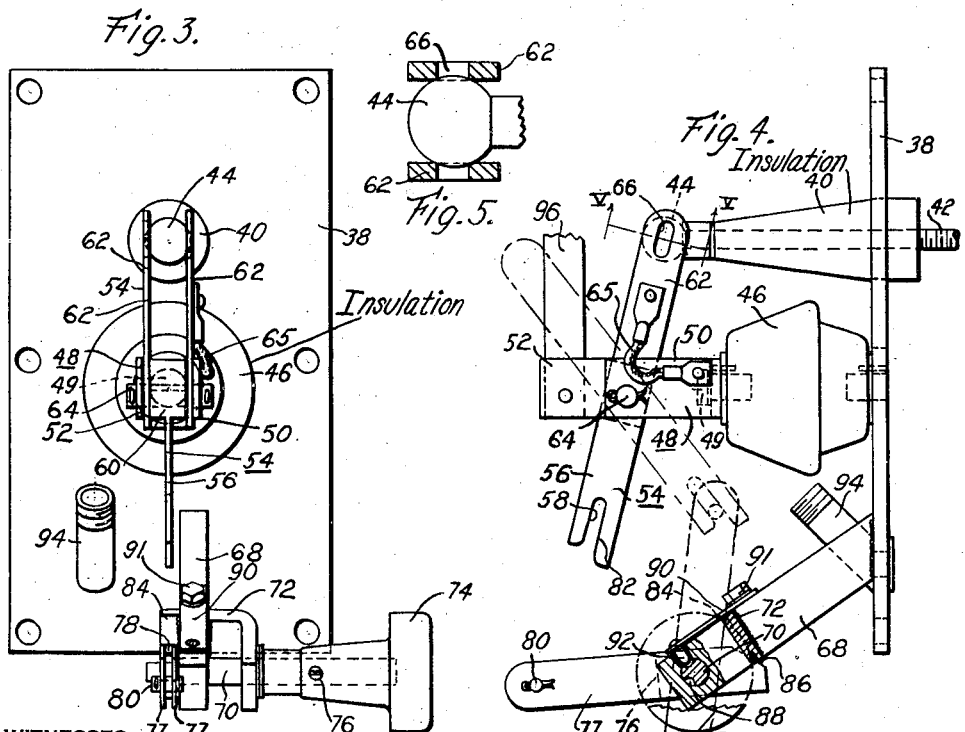
WITNESSES:
Alice L. Howell
Arthur T. Stratton
INVENTOR
William H. Cuttino.
BY
Ralph H. Swingle
ATTORNEY Patented Aug. 27, 1946

2,406,321

UNITED STATES PATENT OFFICE 2,406,321

SWITCHING DEVICE

William H. Cuttino, Wilkinsburg, Pa., assignor to Westinghouse Electric Corporation, East Pittsburgh, Pa., a corporation of Pennsylvania Application March 29, 1943, Serial No. 480,945

9 Claims. (Cl. 200—5)

This invention relates generally to electric switching devices, and more particularly to such devices per se and to a particular cooperative assembly of ground and line switch devices.

One specific application which this invention is concerned with is in the grounding of capacitor units incident to switching operations. When performing switching operations to a line-connected capacitor, it is essential that a circuit to ground be established before a switching operation is undertaken to avoid excessive arcing and consequent danger of flashover and injury to the operator and adjacent structures.

Accordingly, one object of this invention is to provide a novel arrangement of ground and line switches to insure closing of the ground switch prior to opening of the line switch.

Another object of this invention is to provide novel actuating means for a line switch comprising a ground switch having a movable contact which is operable to engage the movable contact of the line switch to actuate the latter.

Another object of this invention is to provide a novel arrangement of a plurality of switches such that the movable contact of one switch is movable into and out of the electrical circuit of another switch and is capable of actuating such other switch.

Another object of this invention is to provide a switch having a novel contact construction designed to hold the switch in closed circuit position.

Another object of this invention is to provide a switch having a novel limited area contact construction.

Another object of this invention is to provide a novel disconnect type of switch which is simplified in construction yet efficient in operation.

Another object of this invention is to provide a novel switch assembly which is capable of being mounted as a unit in an opening of a casing forming the support for connected electrical apparatus.

These and other objects of this invention will become more apparent upon consideration of the following description of a preferred embodiment thereof, when taken in connection with the attached drawing, in which:

Figure 1 is a diagrammatic view illustrating one application for the invention,

Fig. 2 is a fragmentary view partially in section and partially in elevation of a capacitor supporting housing with the switch constituting this invention mounted therein, Fig. 3 is an enlarged plan view of the switch shown in Fig. 2, Fig. 4 is a side view of the switch shown in Fig. 3, and Fig. 5 is an enlarged cross sectional view taken substantially on the line V—V of Fig. 4.

The particular assembly of a ground and line switch constituting this invention, is especially constructed for use in applications where it is required that the ground switch be closed prior to opening of the line switch. One application for a switching arrangement of this type is shown in Fig. 1, wherein capacitor units 2 are connected to a supply conductor 4 at one end, and may be connected at the other end by a line switch 6 to a similar arrangement of capacitors; for example, in a zero sequence capacitor potential device arrangement. However, in opening line switch 6 for testing purposes or to isolate the circuit controlled thereby, it is necessary that the capacitors be grounded before switch 6 is opened. A grounding switch 8 is, therefore, provided for connecting the capacitors to a suitable ground 10. While separate line and grounding switches may be provided with some sort of interlocking means to require closing the grounding switch 8 before opening of the line switch 6, such a structure would be relatively complex, and this invention is specifically directed to a novel combination of a grounding switch and line switch arranged to cooperate in a novel manner to obtain the results desired without the use of any such interlocking means, but preferably arranged so that one switch is arranged to actuate the other in a predetermined sequence.

In the specific embodiment illustrated in Figs. 2 to 5, there is disclosed a capacitor supporting housing 12 adapted to have a hollow insulator 14 supported on the top wall 16 thereof. The capacitor unit or units are preferably mounted within hollow insulator 14 and a terminal bushing 18 projects from the lower end of hollow insulator 14 into supporting casing 12 through opening 20 in top wall 16. The capacitor insulating housing 14 may be of any desired insulating material, preferably of porcelain or the like. The housing 14 is preferably supported on top wall 16 of the supporting housing by means of a metallic supporting plate structure 22, bolted as at 23 to top wall 16. Supporting plate structure 22 may comprise a plurality of sheet metal laminations welded or otherwise secured together, with the topmost lamination in the form of a ring within which the lower end of capacitor housing 14 is positioned.

Terminal bushing 18 of the capacitor structure is preferably provided with a central passage for the reception of a capacitor terminal rod 24, the outer end of which is threaded as shown. A terminal strap 25 is secured to terminal rod 24, for example, as by a nut 27. One end of terminal strap 25 is preferably directed downwardly at right angles and provided with a threaded opening for receiving an adjustable screw 26 which forms one electrode of a spill-over gap. The other electrode of the gap may be formed by an adjustable screw 28 spaced from screw electrode 26 and supported by a conducting strap 30 secured to supporting plate 22 in any desired manner, such, for example, as by welding or the like.

Supporting housing 12 is grounded, so that screw electrode 28 is also grounded through conducting strap 30, supporting plate 22 and supporting casing 12. Accordingly, upon the occurrence of overvoltages, the gap between screw electrodes 26 and 28 will be broken down, and such overvoltages may pass to ground.

Side walls 32 and 34 of supporting casing 12 may be provided with openings adapted to be closed by cover plates 36 and 38, respectively, which may be bolted in place, as shown. Cover plate 38 is adapted to support applicant's novel switching arrangement as a unit, so that it may be removed with the cover plate from supporting housing 12. As shown in Fig. 2, cover plate 38 is provided with an insulating bushing 40 extending therethrough, and this bushing is provided with a central passage for receiving a terminal rod 42 having one end extending outside the housing 12 for connection to other apparatus, and having at its inner end within housing 12, a switch contact 44 formed thereon which is provided with convex contacting portions, and, as shown, is preferably in the form of a sphere. An insulator 46 is mounted on the inner side of cover plate 38, and is adapted to support a generally U-shaped blade support 48. The bight portion of blade support 48 is secured to insulator 46, for example, as by a bolt 49, and the support is provided with one leg 52 which is longer than, and extends beyond, the other leg 50 thereof, for a purpose to be hereinafter described. Blade support 48 is adapted to pivotally mount a switch blade designated generally by the numeral 54. Switch blade 54 is adapted to be pivotally mounted intermediate the ends thereof with one end constituting an operating arm 56 with its outer end formed with a slot 58, for a purpose to be hereinafter referred to. Operating arm 56 of the switch blade is provided at its inner end with an integral enlarged head 60 having secured to opposite sides thereof switch blades 62. Switch blades 62 should be of a good conducting resilient material such, for example, as a copper alloy, and they may be secured to head 60 in any desired manner such, for example, as by brazing or riveting. The inner ends of switch blades 62 are provided with apertures aligned with an aperture through head 60 for receiving a pivot pin 64 also extending through legs 50 and 52 of the blade support, to pivotally mount blade 54 intermediate its ends. Blade 54 is preferably electrically connected with blade support 48 by a flexible shunt or the like 65, connected at its ends with one switch blade 62 and blade support 48, respectively. The outer end of each switch blade 62 is provided with an elongated slot 66 for receiving spherical contact 44 in the closed circuit position of the switch.

Switch blades 62 should have the outer ends thereof spaced apart a distance less than the diameter of spherical contact 44 so that when the switch is closed, as shown in Figs. 3 to 5, convex portions of spherical contact 44 will be received in slot 66 (Fig. 5) to form in effect a resilient detent opposing opening movement of the switch blade. It will also be noticed that the edges of slots 66 are formed by cutting through the blades at right angles to leave relatively sharp edge portions for engaging contact 44, with the result that the actual engagement between each blade 62 and contact 44 is substantially two point contacts. This clearly limits the contacting area of blades 62 and contact 44, and because of the relatively small contact area, the contact pressure may be relatively high. The contact pressure is produced by reason of the fact that the outer ends of blades 62, as stated above, normally occupy a position spaced apart a distance substantially less than the diameter of contact 44, so that in closing the switch, that is in moving blades 62 from the dotted line position to the full line position shown in Fig. 4, blades 62 will engage an outer portion of contact 44 and will be forced relatively apart by the resulting cam action of the curved contour of the contact on the blades, until slots 66 are presented opposite the greatest dimension of contact 44, whereupon the blades may move towards each other a slight amount while portions of contact 44 enter the slots 66 in detent fashion. Movement of blades 62 apart stresses the blades, and they will tend to move back towards each other due to their inherent resiliency, with the result that at the closed circuit position shown in Figs. 3 to 5, edge portions of slots 66 will be maintained in engagement with contact 44 under considerable pressure.

In order to provide for closing a grounding circuit before switch blade 54 is opened, there is provided an angularly extending supporting member 68 secured to the inner surface of cover plate 38, and provided at its outer end with an aperture for receiving a grounding blade operating shaft 70. Support 68 also has secured thereto a bearing bracket 72 which is right angular in form with one leg secured to support 68, for example, as by welding or the like, and with the other leg thereof formed with an aperture providing a bearing for operating shaft 70 spaced from support 68. An operating knob 74 may be secured to one end of operating shaft 70 as by a set screw 76, so that the shaft may be manually rotated. On the other end of actuating shaft 70 are mounted grounding blades 77 maintained in predetermined spaced relation by a spacer block 78 to which the blades are secured, in any desired manner, such, for example, as by riveting or brazing. The blades and spacer block 78 are also secured to operating shaft 70 in any desired manner, preferably by welding or the like. The outer ends of grounding blades 77 are apertured to receive an operating pin 80 for switch blade 54.

In the operation of the switching arrangement described thus far, let it be assumed that switch blade 54 is at its closed circuit position shown in Figs. 3 to 5, and that grounding switch blades 77 are at a position wherein they are spaced from switch blade 54, all as shown in Figs. 3 to 5. Now when it is desired to open switch blade 54, operating knob 74 may be manually grasped and rotated in a clockwise direction, as viewed in Fig. 4. Such rotation of actuating shaft 70 first brings grounding blades 77 into proximity with the outer end of operating arm 56 of switch blade 54. It will be noted that one side 82 of slot 58 in the operating arm is longer than the opposite side so that upon continued rotation of operating shaft 70 in the same direction, operating arm 56 will be received between grounding blades 77, and operating pin 80 will engage the side 82 of slot 58. This will electrically connect grounding blades 77 and line switch blade 54 prior to opening movement of line switch blade 54. Upon continued rotation of knob 74 in the same direction, switch blade 54 is caused to rotate in a counterclockwise direction about its pivot 64 to the open circuit position shown in dotted lines in Fig. 4 of the drawing. It will be noted that grounding switch blade support 68 is provided with a stop lug 84 which may be formed integral therewith or rigidly attached thereto in any desired manner, and this lug is engageable by grounding switch blades 77 upon continued rotation of knob 74 in a clockwise direction when the dotted line position shown in Fig. 4 is reached. It will be noted that operating pin 80 is received in slot 58 throughout opening movement of line switch blade 54, so that throughout this movement blade 54 is positively maintained in predetermined relation with respect to grounding switch blades 77. The line switch may be moved from the dotted line to the full line position shown in Fig. 4 by rotation of operating knob 74 in the opposite direction, that is, in a counterclockwise direction as viewed in Fig. 4. This results first in closure of the line switch, because operating pin 80 is retained in slot 58 throughout movement of blade 54 from the dotted to the full line position shown in Fig. 4. When the closed position of the line switch is attained, pin 80 may escape from slot 58 and upon continued rotation of operating knob 74 in the same direction, grounding switch blades 77 will be moved to the full line position wherein they are spaced from line switch blade 54.

It will be noted that the inner end of grounding switch blades 77 are cut off as at 86 so as to be engageable with stop lug 84 to limit movement of the grounding switch blades to their full open position shown in full lines in Figs. 3 and 4. Furthermore, means are preferably provided for maintaining the operating shaft 70 at its extreme positions. This means is preferably in the form of a spring detent comprising a leaf spring 90 secured at one end as by a bolt 91 to grounding blade support 68, and having at its other end a detent finger 92 engageable through an opening provided in support 68, with angularly spaced indentations 88 provided in operating shaft 70. Indentations 88 are angularly spaced about the operating shaft at positions corresponding to the dotted and full line positions shown in Fig. 4. Accordingly, it will be apparent that both switch blades are maintained in the full line position shown in Fig. 4 by resilient detent means, comprising the detent finger 92 for holding grounding blades 77, and the detent formed by slots 66 in line switch blades 62 for holding blade 54. Furthermore, both blades are maintained at the dotted line position shown in Fig. 4 by detent finger 92, and by the engagement of operating pin 80 in slot 58 of switch blade 54.

Cover plate 38 supporting the novel switch assembly may also be provided with a vent pipe 94, if desired. Switch blade support 40 is electrically connected with terminal rod 24 of the capacitor unit by a conductor strap 96. It will be apparent, therefore, that switch blade 54 is operable to control the circuit from the capacitor structure to terminal rod 42, whereas grounding switch blades 77 are operative to ground the capacitor structure when in engagement with blade 54.

From the foregoing it will be apparent that this invention not only results in the provision of a novel switch structure formed in a manner such as to provide a novel detent operative to oppose opening movement of the switch, and also constructed to provide a novel high pressure limited area contact in the closed position of the switch, but that a novel arrangement of line and grounding switch means are provided with but one switch having an operating means, and the movable contact of this one switch adapted to actuate the movable contact of the other switch, to thereby operate the switches in predetermined sequence. In the particular embodiment of the invention disclosed, a grounding switch blade is provided for operating the blade of a line switch, so that the circuit is grounded before it is possible to open the line switch. Conversely, it is required that the line switch be closed before the grounding circuit can be opened. In addition to the foregoing, this invention comprehends the unitary assembly of a plurality of switching devices on a single mounting panel which may also comprise a closure for the opening in a supporting housing for other apparatus.

Having described preferred embodiments of the invention as required by the patent statutes, it is desired that the invention be not limited to this particular embodiment, inasmuch as it will be apparent to persons skilled in the art that many changes and modifications may be made in this particular embodiment without departing from the broad spirit and scope of this invention. Accordingly, the invention should be interpreted as broadly as possible and should be restricted only as required by the prior art.

I claim as my invention:

1. Switching apparatus of the type described comprising, main switch means having spaced insulated terminals, a contact mounted for movement to and away from bridging relation with respect to said terminals, a grounding contact mounted for movement in a path intersecting the movable contact of said main switch at least in its closed circuit position, and actuating means for said grounding contact, whereby upon continued movement of said actuating means in a direction to open the main switch circuit, said grounding contact is first moved to engage the movable contact of said main switch means and thereafter the latter is moved to an open circuit position by said grounding contact.

2. Switching apparatus of the type described comprising, main switch means having spaced insulated terminals, a contact mounted for movement to and away from bridging relation with respect to said terminals, a grounding contact mounted for movement in a path intersecting the movable contact of said main switch, actuating means operable in one direction to move said grounding contact into engagement with the movable contact of said main switch means, interfitting means on said contacts adapted to be engaged when said movable contacts are in engagement, and the paths of movement of said movable contact being such that said interfitting means remain in engagement, whereby upon continued operation of said actuating means in said one direction said bridging contact is moved to open circuit position, and upon operation of said actuating means in the opposite direction said bridging contact is first moved to closed circuit position and thereafter said grounding contact is disengaged from said bridging contact and movable to a position spaced therefrom.

3. In switch structure, a first contact mounted for movement into and out of engagement with a cooperating contact, a movably mounted grounding contact, said movable contacts having portions adapted to be in engagement during movement of said first contact, the path of movement of said grounding contact extending beyond its movement in engagement with said first contact, whereby said grounding contact is movable to and from a position spaced away from said first contact into engagement with said first contact to actuate said first contact into and out of engagement with said cooperating contact, and means for actuating said grounding contact.

4. In a switch structure, a first contact pivotally mounted for movement into and out of engagement with a cooperating contact, a pivotally mounted grounding contact, said movable contacts having portions thereof traversing arcuate paths of movement which intersect with the path of movement of said grounding contact portion extending beyond the path of movement of said first contact portion in one direction, whereby said grounding contact is movable to and from a position spaced away from said first contact into engagement therewith to actuate said first contact into and out of engagement with said cooperating contact, and means for actuating said grounding contact.

5. In a switch structure, a first contact pivotally mounted intermediate the ends thereof for movement of one end of said contact into and out of engagement with a cooperating contact, a grounding contact mounted for movement in a path intersecting and overlapping the other end of said first contact, whereby said grounding contact is movable to and from a position spaced away from said first contact into engagement with said other end of said first contact to actuate said first contact into and out of engagement with said cooperating contact, and means for actuating said grounding contact.

6. In switch structure, a first contact mounted for movement into and out of engagement with a cooperating contact, a second movably mounted contact, said movable contacts having portions adapted to be in engagement during movement of one of said movable contacts, the path of movement of the other of said movable contacts extending beyond its movement while in engagement with said one contact, whereby said other contact is movable to and from a position spaced away from said one contact into engagement with said one contact to actuate said one contact into and out of engagement with said cooperating contact, and means for actuating said other contact.

7. In a switch structure, a first contact pivotally mounted intermediate its ends, a second pivotally mounted contact, means supporting said contacts so that a part of the path of movement of an end portion of one contact intersects the path of movement of an end portion of the other of said contacts, whereby said one contact is movable to and from a position spaced from said other contact into engagement therewith and is also movable when in engagement to cause movement of said other contact, and actuating means for said one contact.

8. In a switch structure, a first contact pivotally mounted intermediate its ends, a second pivotally mounted contact, means supporting said contacts so that a part of the path of movement of an end portion of one contact intersects the path of movement of an end portion of the other of said contacts, freely engageable pin and slot means on said contact portions, respectively, whereby said one contact is movable to and from a position spaced from said other contact into engagement therewith and is also movable when in engagement to cause movement of said other contact in opposite directions, and actuating means for said one contact.

9. Switching apparatus of the type described comprising, main switch means having spaced insulated terminals, a contact mounted for movement to and away from bridging relation with respect to said terminals, means frictionally retaining said contact in closed circuit position, a grounding contact mounted for movement in a path intersecting the movable contact of said main switch at its closed circuit position, actuating means operable in one direction to move said grounding contact into engagement with the movable contact of said main switch means, interfitting means on said contacts adapted to be engaged to prevent relative movement of said contacts when said movable contacts are in engagement, and means limiting movement of said grounding contact from a position in engagement with said main switch contact when the latter is at an open circuit position to a position wherein said main switch is closed and said grounding contact is spaced from said main switch contact, whereby said main switch contact is frictionally held at its closed circuit position and is incapable of movement relative to said grounding contact at other positions thereof.

WILLIAM H. CUTTINO.